United States Patent
O'Brien

(10) Patent No.: US 10,911,568 B2
(45) Date of Patent: Feb. 2, 2021

(54) CLIENT SOFTWARE BACK OFF

(71) Applicant: Twitter, Inc., San Francisco, CA (US)

(72) Inventor: Nolan O'Brien, Henderson, NV (US)

(73) Assignee: Twitter, Inc., San Francisco, CA (US)

( * ) Notice: Subject to any disclaimer, the term of this patent is extended or adjusted under 35 U.S.C. 154(b) by 41 days.

(21) Appl. No.: 16/151,266

(22) Filed: Oct. 3, 2018

(65) Prior Publication Data

US 2020/0112622 A1 Apr. 9, 2020

(51) Int. Cl.
*H04L 29/08* (2006.01)
*H04L 12/58* (2006.01)

(52) U.S. Cl.
CPC ............ *H04L 67/325* (2013.01); *H04L 51/32* (2013.01); *H04L 51/38* (2013.01)

(58) Field of Classification Search
CPC ........ H04L 67/325; H04L 51/32; H04L 51/38
USPC ....................................................... 709/203
See application file for complete search history.

(56) References Cited

U.S. PATENT DOCUMENTS

| | | | |
|---|---|---|---|
| 6,868,087 B1 * | 3/2005 | Agarwala | H04L 47/50 370/412 |
| 2004/0249944 A1 * | 12/2004 | Hosking | G06F 9/54 709/225 |
| 2006/0109857 A1 * | 5/2006 | Herrmann | H04L 47/10 370/412 |
| 2009/0028095 A1 * | 1/2009 | Kish | H04W 88/06 370/328 |
| 2015/0026525 A1 * | 1/2015 | Byrne | G06F 11/079 714/39 |

FOREIGN PATENT DOCUMENTS

WO    WO-2013066608 A1 *   5/2013   ............. G06Q 50/01

OTHER PUBLICATIONS

Capucho; Rafael, "Enhance the quality of your API calls with Client-Side Throttling," Oct. 2, 2016, retrieved on Sep. 24, 2019, retrieved from URL <https://rafaelcapucho.github.io/2016/10/enhance-the-quality-of-your-api-calls-with-client-side-throttling/>, 5 pages.
International Search Report and Written Opinion in International Appln. No. PCT/US2019/054061, dated Dec. 13, 2019, 13 pages.

* cited by examiner

*Primary Examiner* — Zi Ye
(74) *Attorney, Agent, or Firm* — Fish & Richardson P.C.

(57) ABSTRACT

Methods, systems, and apparatus, including computer programs encoded on computer storage media, for limiting load on host servers that implement a social messaging platform. An example user device sends, to a platform comprising a plurality of host servers, a first request. The request is directed to a first endpoint. The user device receives, in response to the first request, a first error that indicates that the first request was not processed. The user device determines a back off time and places subsequent requests to the platform that are initiated before the back off time elapses and that are directed to the first endpoint in a back off queue in an order in which the subsequent requests are initiated. The user device sends, to the platform, the requests in the back off queue after the back off time has elapsed, until the back off queue is empty.

24 Claims, 3 Drawing Sheets

CLIENT SOFTWARE BACK OFF

BACKGROUND

This specification relates to social messaging platforms, and in particular, to limiting load on one or more host servers that implement a social messaging platform.

Social messaging platforms and network-connected personal computing devices allow users to create and share content across multiple devices in real-time.

Sophisticated mobile computing devices such as smartphones and tablets make it easy and convenient for people and companies, for example, to use social networking messaging platforms and applications. Popular social messaging platforms generally provide functionality for users to draft and post messages, both synchronously and asynchronously, to other users. Other common features include the ability to post messages that are visible to one or more identified other users of the platform, or even publicly to any user of the platform without specific designation by the authoring user. Examples of popular social messaging platforms include Facebook, Pinterest, and Twitter. ("Facebook" is a trademark of Facebook, Inc. "Pinterest" is a trademark of Pinterest, Inc. "Twitter" is a trademark of Twitter, Inc.)

SUMMARY

This specification describes technologies for limiting load on one or more host servers that implement a social messaging platform.

An appropriately programmed user device sends, to a platform including one or more host servers, a first request originating from the user device. The first request is directed to a first endpoint. The user device receives, in response to the first request and from the platform, a first error that indicates that the platform is overloaded and that the first request was not processed. The user device determines a back off time and places subsequent requests to the platform originating from the user device that are initiated before the back off time elapses and that are directed to the first endpoint in a back off queue in an order in which the subsequent requests are initiated. The user device sends, to the platform, the requests in the back off queue after the back off time elapses, until the back off queue is empty.

The subject matter described in this specification can be implemented in particular embodiments so as to realize one or more of the following advantages. During high-traffic events, queuing requests from a user device to a particular endpoint or a particular domain reduces the risk of server overload while reducing client application performance only slightly. Additionally, because the user device briefly delays sending requests during such high-traffic events and thereafter sends requests serially for at least some period of time, the user device is less likely to receive a flood of errors from the platform, which improves user experience.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
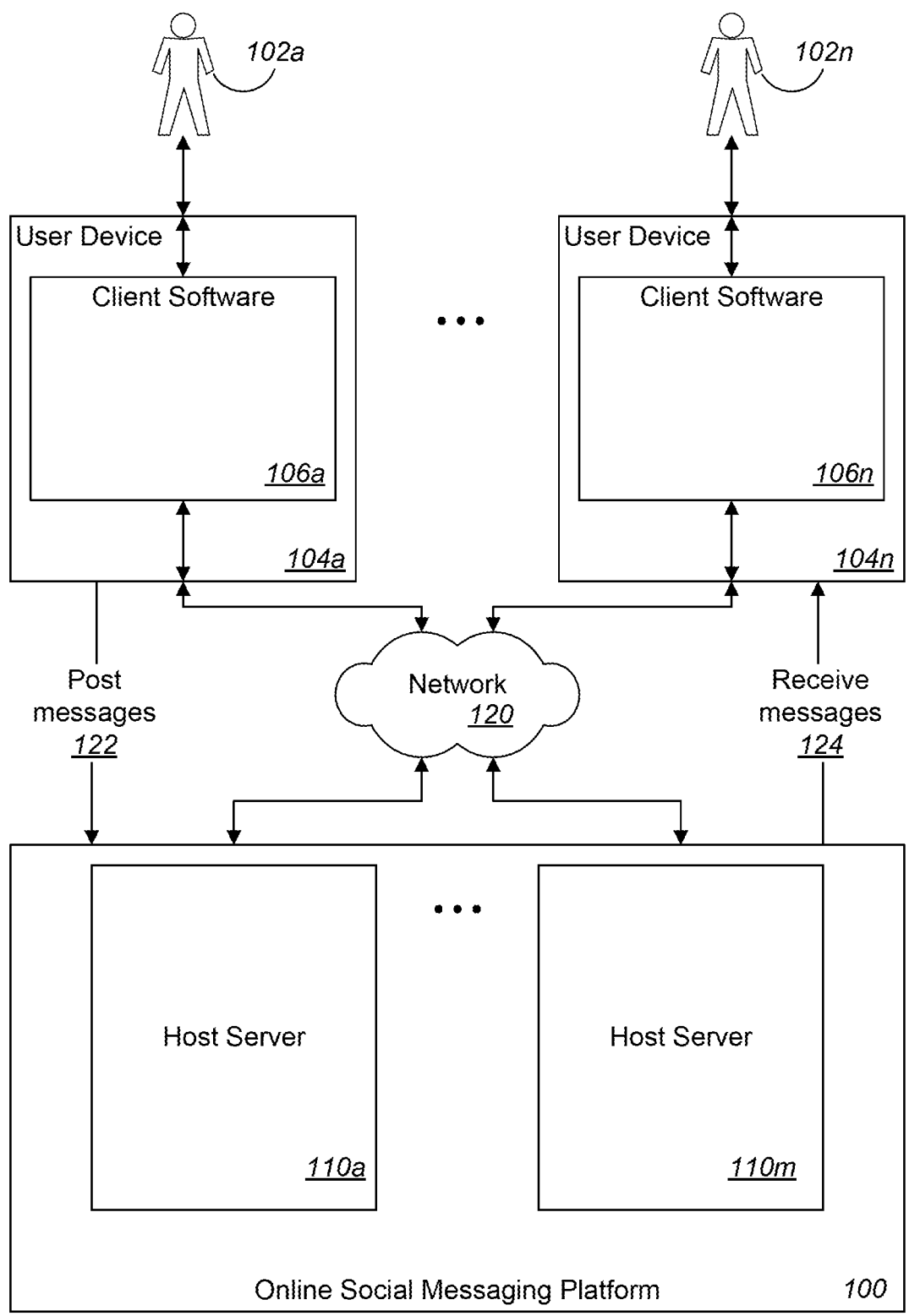
FIG. 1 illustrates an example online social messaging platform.

FIG. 1 illustrates an example online social messaging platform 100 and example user devices 104*a*-104*n* configured to interact with the platform over one or more wired or wireless data communication networks 120. The user devices run client software 106*a*-106*n* that is configured, as will be described in more detail in reference to FIGS. 2 and 3, to implement a back off mode to limit load on the one or more host servers.

The platform is implemented on one or more host servers 110*a*-110*m*. Each host server is implemented on one or more computers, e.g., on a cluster of computers. Host servers may also be implemented in containers or virtual machines, in which case multiple host servers may be implemented on a single computer.

Users

Users 102*a*-102*n* of the platform use user devices 104*a*-104*n*, on which client software 106*a*-106*n* is installed, to use the platform. Users can interact with the social messaging platform using the respective client software on their respective user devices.

A user may be account holder of an account, or an authorized user of an account, on the platform. The platform may have millions of accounts of individuals, businesses, or other entities, e.g., pseudonym accounts, novelty accounts, and so on.

In some implementations, the platform allows use of the platform by users who are not account holders or who are not logged in to an account of the platform. If the platform allows use by such users, the platform may allow such a user to post messages or to use other functionality of the platform by associating the user with a temporary account or identifier.

User Device and Client Software

A user device can be any Internet-connected device, e.g., a laptop or desktop computer, a smartphone, or an electronic tablet. The user device can be connected to the Internet through a mobile network, through an Internet service provider (ISP), or otherwise.

Each user device is configured with software, which will be referred to as a client or as client software 106*a*-106*n*, that in operation can access the platform so that a user can post and receive messages, view and curate the user's streams, and view and interact with lists of content items. On any particular user device, the client may be a web browser or an HTML (hypertext markup language) document rendered by a web browser. Or the client may be JavaScript code or Java code. Or the client may also be dedicated software, e.g., an installed app or installed application, that is designed to work specifically with the platform. Or the client may be or include a Short Messaging Service (SMS) interface, an instant messaging interface, an e-mail-based interface, or an API function-based interface, for example.

Platform

The social messaging platform 100 is implemented on one or more computers in one or more locations that operate as one or more servers that support connections over the data communication networks 120 from many different kinds of user devices. The platform may have anywhere from hundreds of thousands to millions of connections may be established or in use between clients and the platform at any given moment.

The platform facilitates real-time communication. The platform and client software are configured to enable users to use the platform, over the data communication networks 120, to post messages 122 to the platform and to receive messages 124 posted by other users.

In some implementations, the platform provides facilities for users to send messages directly to one or more other users of the platform, allowing the sender and recipients to maintain a private exchange of messages.

The platform is configured to provide content, generally messages, to a user in a home feed message stream. The messages will generally be messages from accounts the user is following, meaning that the recipient has registered to receive messages posted by the followed account, and optionally content that the user or such followed accounts have engaged with, e.g., endorsed. Optionally, the platform is configured to include in a recipient user's home feed stream messages that the platform determines are likely to be of interest to the recipient, e.g., messages on topics of particular current interest, as represented by the number of messages posted on the topics platform users, or messages posted on the topics of apparent interest to the recipient, as represented by messages the recipient has posted or engaged with, as well as selected advertisements, public service announcements, promoted content, or the like.

The platform is configured to enable users to exchange messages in real-time, i.e., with a minimal delay. The platform is also configured to enable users to respond to messages posted earlier, on the order of hours or days or even longer. The platform is configured to display posted messages to one or more other users within a short time frame so as to facilitate what can essentially be a live conversation between the users.

Thus, the basic messaging functionality of the platform includes at least posting new messages, providing message streams on client request, managing accounts, managing connections between accounts, messages, and streams, and receiving engagement data from clients engaging with messages. The platform also indexes content items and access data and can provide the indexed data to account holders.

Messages

Generally, a message posted to the platform contains data representing content provided by the author of the message. The message may be a container data type storing the content data. The types of data that may be stored in a message include text, graphics, images, video, and computer code, e.g., uniform resource locators (URLs), for example. Messages can also include key phrases, e.g., hashtags, that can aid in categorizing messages or relating messages to topics. Messages can also include metadata that may or may not be editable by the message author or account holder, depending on what the platform permits. Examples of message metadata include a time and date of authorship and a geographical location of the user device when it submitted the message. In some implementations, what metadata is provided to the platform by a client is determined by privacy settings controlled by the user or the account holder.

Messages composed by one account holder may reference other accounts, other messages, or both. For example, a message may be composed in reply to another message composed by another account. A message may also be composed by a user in reply to a message originally posted by the user. Messages may also be republications of a message composed by and received from another account.

Generally, an account referenced in a message may appear as visible content in the message, e.g., the name of the account, and may also appear as metadata in the message. As a result, the referenced accounts can be interactive in the platform. For example, users may interact with account names that appear in their message stream to navigate to the message streams of those accounts. The platform also allows users to designate particular messages as private; a private message will only appear in the message streams of the composing and recipient accounts.

In some implementations, messages are microblog posts, which differ from e-mail messages, for example, in that an author of a microblog post does not necessarily need to specify, or even know, who the recipients of the message will be.

Streams

A stream is a stream of messages on the platform that meet one or more stream criteria. A stream can be defined by the stream criteria to include messages posted by one or more accounts. For example, the contents of a stream for a requesting account holder may include one or more of (i) messages composed by that account holder, (ii) messages composed by the other accounts that the requested account holder follows, (iii) messages authored by other accounts that reference the requested account holder, or (iv) messages sponsored by third parties for inclusion in the account holder's message stream. The messages of a stream may be ordered chronologically by time and date of authorship, or reverse chronologically. Streams may also be ordered in other ways, e.g., according to a computationally predicted relevance to the account holder, or according to some combination of time and relevance score.

A stream may potentially include a large number of messages. For both processing efficiency and the requesting account holder's viewing convenience, the platform generally identifies a subset of messages meeting the stream criteria to send to a requesting client once the stream is generated. The remainder of the messages in the stream are maintained in a stream repository and can be accessed upon client request.

Services Provided by Host Servers

The servers of the platform perform a number of different services that are implemented by software installed and running on the servers. The services will be described as being performed by software modules. In some cases, particular servers may be dedicated to performing one or a few particular services and only have installed those components of the software modules needed for the particular services. Some modules will generally be installed on most or all of the non-special-purpose servers of the platform. The software of each module may be implemented in any convenient form, and parts of a module may be distributed across multiple computers so that the operations of the module are performed by multiple computers running software performing the operations in cooperation with each other. In some implementations, some of the operations of a module are performed by special-purpose hardware.

Figure 2:
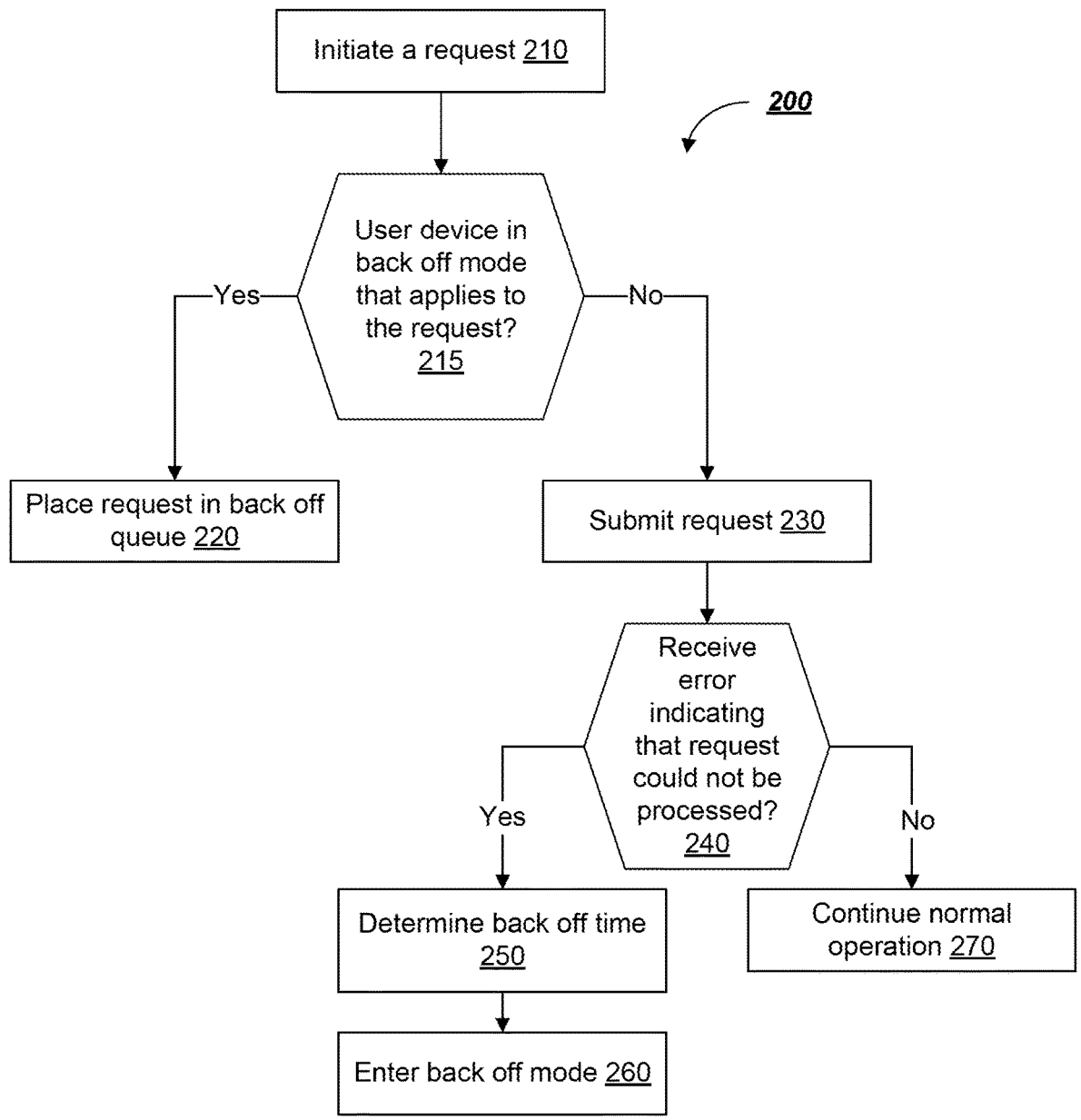
FIGS. 2 and 3 are flow charts illustrating an example process for limiting the load on host servers that implement an online social messaging platform.

FIG. 2 is a flow chart of a first part 200 of an example process for limiting the load on host servers that implement an online social messaging platform. The process will be described below as being performed by an appropriately programmed user device, e.g., the user device 104a of FIG. 1, configured with client software 106a.

The user device initiates a request (210). The request can be any one of a number of different kinds of requests. For example, the request can be a request to download content from the platform, e.g., content authored by other users on the platform, a request to post content to the platform, e.g., content authored by the user of the user device, or a non-content request, e.g., a status request.

A user can initiate the request, e.g., by performing an action in the client software that causes content to be posted to or downloaded from the platform. Or the client software itself can initiate the request without user input. For example, the client software can initiate a status request, or it can automatically initiate a request to download content from the platform after a particular amount of time has elapsed.

The user device determines whether the user device is in a back off mode that applies to the initiated request (215). This depends on the particular back off approach that the user device uses.

If the user device uses a "naïve" back off approach, it determines whether the initiated request is a request to a particular endpoint for which the user device is in a back off mode. Generally, an endpoint is a composition of a domain, e.g., "api.platform.com," and a path, e.g., "/1.1/users/show.json." In some implementations, however, the endpoint uses a sub-path.

If the user device instead uses a "conservative" back off approach, it determines whether the initiated request is a request to a particular domain for which the user device is in a back off mode. Generally, a particular domain includes many endpoints. Consequently, the conservative back off approach generally applies to a broader range of requests than the naïve back off approach.

Finally, if the user device uses an "optimal" back off approach, it determines whether the initiated request is a request that invokes one or more services for which the user device is in a back off mode. For example, the user device may be in a back off mode for a user database service. A keyword search for one user by another user would utilize such a service. So a back off mode would apply to the request associated with the keyword search.

The user device can be in multiple back off modes at one time. For example, if the user device uses the conservative back off approach, the user device can be in a back off mode for two or more domains simultaneously.

The user device can dynamically change its back off approach as platform conditions change. For example, when platform traffic is light, the platform can instruct the user device to use the naïve approach. When platform traffic is heavy, on the other hand, the platform can instruct the user device to use the conservative approach. Alternatively, the user device itself can measure platform traffic and change its back off approach accordingly. In some implementations, changes in back off approach can even be prescheduled, e.g., in advance of events that result in high traffic on the platform.

If the user device is in a back off mode that applies to the request, the user device places the request in a back off queue (220).

If the user device is not in a back off mode that applies to the request, the user device submits the request to the platform (230). In some cases, the platform decides not to process the request. This may occur if the host server or service on the platform that processes requests of that type receives more requests than it can process while still maintaining a minimum acceptable service level. In that case, the platform will generate an error that indicates that the request could not be processed and send that error to the user device. For example, if operating according to an HTTP (Hypertext Transfer Protocol) protocol, the platform will generate a 503 status code ("Service Unavailable") that it returns to the user device. Generally, if the failed request was a request initiated by the user, the user will receive an indication that the request failed, e.g., in a user interface of the client software on the user device. The indication may instruct the user to manually retry the request. On the other hand, if the failed request was a request that was initiated without user input, the user will generally not receive such an indication.

If the user device receives an error (240), e.g., because a host server of the platform is overloaded, the user device determines a back off time (250). The length of the back off time can be equal to a retry-after value included in the error, e.g., in a header of the response that accompanies the 503 status code. Or the back off time can be a function of or based on the retry-after value. The retry-after value specifies an amount of time the user device should wait before resending the request. The retry-after value can be a static value, or the platform can dynamically determine the retry-after value. For example, the retry-after value can be larger when platform traffic is heavier and shorter when platform traffic is lighter. Alternatively, the back off time can be defined by a default configuration on the user device. The back off time can be one second, five seconds, or ten seconds, for example. The back off time will generally not be longer than 30 seconds.

After determining the back off time, the user device enters back off mode (260). The particular type of back off mode that the user device enters depends on both the approach the user device uses, e.g., naïve, conservative, or optimal, and the nature of the request that caused the user device to enter back off mode. For example, if the user device uses the naïve approach, the user device enters back off mode only for the specific endpoint identified in the request. On the other hand, if the user device uses the conservative approach, the user device enters back off mode for the entire domain that would have handled the request. The user device places future requests that are initiated while the user device is still in back off mode and that are directed to the same endpoint (in the case of the naïve approach) or the same domain (in the case of the conservative approach) into the back off queue. The user device can also place the initial request that caused the user device to enter back off mode into the back off queue, i.e., as a retry of the initial request that becomes the first request in the back off queue.

If the user device instead receives a good response from the platform, it continues normal operation, i.e., it does not enter back off mode (270).

Figure 3:
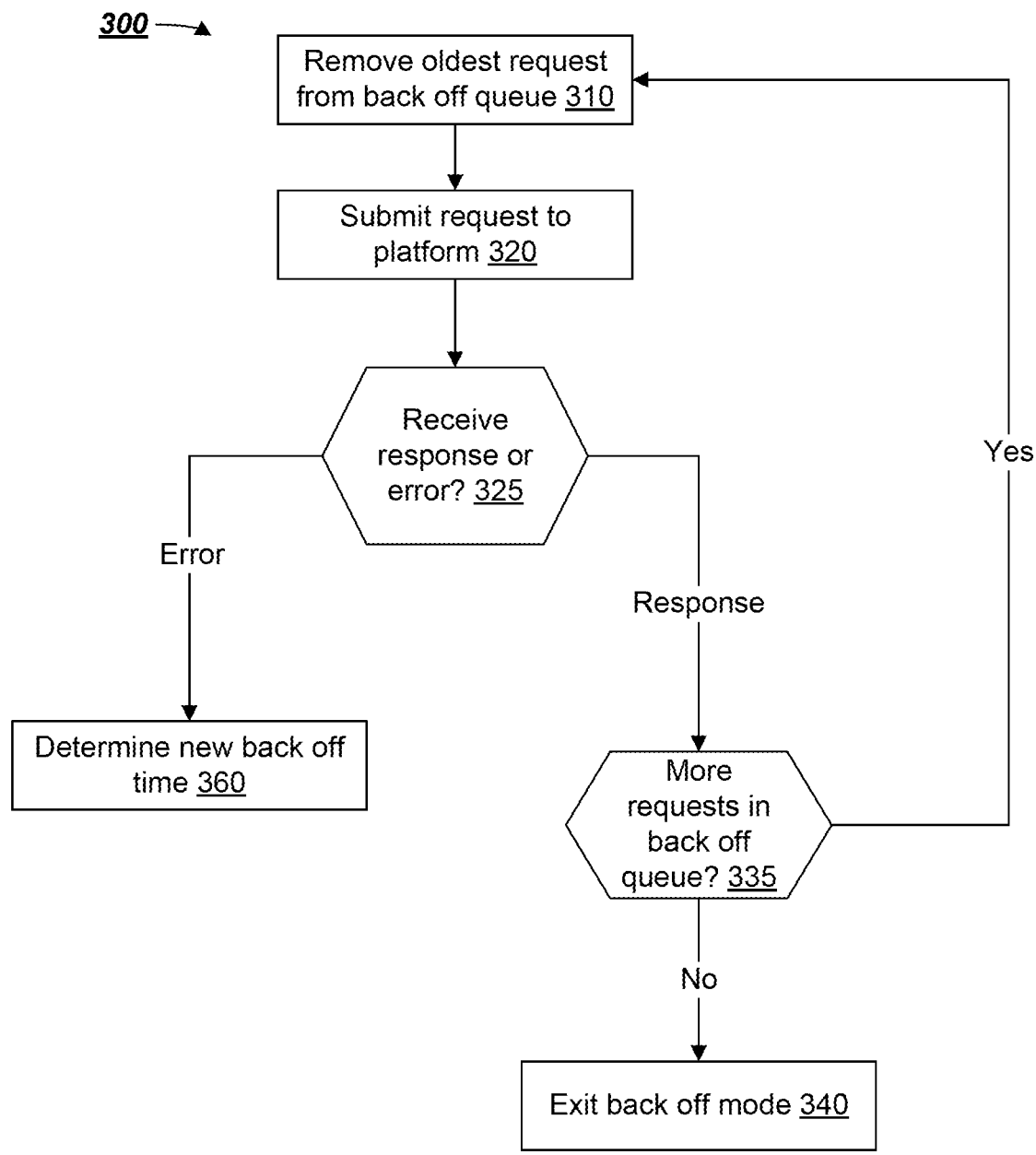

FIG. 3 is a flow chart of a second part 300 of the example process for limiting the load on host servers that implement an online social messaging platform. As above, the process will be described as being performed by an appropriately programmed user device.

When the back off time elapses, the user device removes (310) the oldest request from the back off queue and submits that request (320) to the platform. If the request is successful (325), i.e., if the response is not an error, the user device determines whether there are additional requests in the back off queue (335). If there are additional requests in the back off queue, the user device proceeds to remove and send the now-oldest request in the back off queue (310). This serial sending of requests continues until the back off queue is empty.

In some implementations, instead of waiting until the previous request in the back off queue is successfully processed to send the next request in the back off queue, the user device sends requests in the back off queue concurrently but at a throttled rate. The user device can also send the requests in the back off queue in a different order than they were placed in the back off queue. For example, the user device can send requests that it determines are high-priority requests before it sends low-priority requests.

Once the back off queue is empty, the user device exits back off mode (340) and returns to normal operation. During normal operation, the user device submits requests concurrently instead of serially.

If the user device instead receives an error, the user device determines a new back off time (360).

Placing requests into the back off queue before the back off time has elapsed allows host servers on the platform to catch up and complete requests it is currently processing without being burdened with new requests, while at the same time not sending user devices a flood of errors. This is because all user devices that interact with the platform implement the back off mode.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. The essential elements of a computer are a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more mass storage devices. The mass storage devices can be, for example, magnetic, magneto-optical, or optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network.

Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method performed by a user device, the method comprising:

sending, to a platform comprising a plurality of host servers, a first request originating from the user device, wherein the first request is directed to a first endpoint;

receiving, in response to the first request and from the platform, a first error that indicates that the platform is overloaded and that the first request was not processed;

determining a back off time;

placing subsequent requests to the platform originating from the user device that are initiated before the back off time elapses and that are directed to the first endpoint in a back off queue in an order in which the subsequent requests are initiated; and sending, to the platform, the requests in the back off queue after the back off time has elapsed, until the back off queue is empty.

Embodiment 2 is the method of embodiment 1, wherein sending the requests in the back off queue comprises sending the requests in the order in which the requests were placed into the back off queue.

Embodiment 3 is the method of any of embodiments 1-2, wherein determining the back off time comprises setting the back off time from a retry-after value included in the first error that specifies an amount of time the user device should wait before resending the first request.

Embodiment 4 is the method of any of embodiments 1-2, wherein determining the back off time comprises using a default value on the user device as the back off time.

Embodiment 5 is the method of any of embodiments 1-4, wherein the method further comprises:

placing the first request into the back off queue, or indicating to a user of the user device that the first request was not processed and that the user should manually resend the first request.

Embodiment 6 is the method of any of embodiments 1-5, wherein the method further comprises:

adding new requests originating from the user device that are directed to the first endpoint to the back off queue while the user device is sending the requests in the back off queue to the platform; and after the back off queue is empty, concurrently sending, to the platform, new requests originating from the user device that are directed to the first endpoint.

Embodiment 7 is the method of any of embodiments 1-6, wherein the method further comprises:

receiving a second error that indicates that the platform is overloaded in response to sending a request into the back off queue to the platform; and resetting the back off time.

Embodiment 8 is the method of any of embodiments 1-7, wherein the first request is a request generated in response to an action by a user of the user device.

Embodiment 9 is the method of any of embodiments 1-7, wherein the first request is a request generated automatically by the user device.

Embodiment 10 is the method of any of embodiments 1-9, wherein the first request is further directed to a first domain, and wherein the operations further comprise:

placing subsequent requests to the platform originating from the user device that are initiated before the back off time elapses and that are directed to the first domain into the back off queue.

Embodiment 11 is a user device comprising one or more computers and one or more storage devices storing instructions that are operable, when executed by the one or more computers, to cause the one or more computers to perform the method of any one of embodiments 1-10.

Embodiment 12 is one or more computer storage media storing instructions that are operable, when executed by a user device comprising one or more computers, to cause the user device to perform the method of any one of embodiments 1-10.

Embodiment 13 is a server system comprising one or more computers configured to transmit to a user device one or more modules of instructions that are operable, when executed by the user device, to cause the user device to perform the method of any one of embodiments 1-10.

While this specification contains many specific implementation details, these should not be construed as limitations on the scope of any invention or on the scope of what is being or may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A user device comprising one or more computers and one or more storage devices storing instructions that are operable, when executed by the one or more computers, to cause the one or more computers to perform operations comprising:
sending, to a platform comprising a plurality of host servers, a first request originating from client software running on the user device, wherein the first request is directed to a first endpoint of the platform, wherein the first endpoint is a composition of a first domain and a first path;
receiving, in response to the first request and from the platform, a first error that indicates that the platform is overloaded and that the first request was not processed;
determining, by the user device, a back off time;
receiving, from the client software, one or more subsequent requests to the platform originating from the client software that are initiated before the back off time elapses and that are directed to endpoints that are compositions of paths and the first domain and not to endpoints that are compositions of paths and a second domain that is not the first domain;
placing, by the user device, the first request and then the one or more subsequent requests in a back off queue in an order in which the subsequent requests are initiated; and
sending, by the user device and to the platform, the requests in the back off queue after the back off time has elapsed, until the back off queue is empty.

2. The user device of claim 1, wherein sending the requests in the back off queue comprises sending the requests in the order in which the requests were placed into the back off queue.

3. The user device of claim 1, wherein determining the back off time comprises setting the back off time from a retry-after value included in the first error that specifies an amount of time the user device should wait before resending the first request.

4. The user device of claim 1, wherein determining the back off time comprises using a default value specified by the client software as the back off time.

5. The user device of claim 1, wherein the operations further comprise:
adding new requests originating from the client software that are directed to the first endpoint to the back off queue while the user device is sending the requests in the back off queue to the platform; and
after the back off queue is empty, concurrently sending, to the platform, new requests originating from the client software that are directed to the first endpoint.

6. The user device of claim 1, wherein the operations further comprise:
receiving a second error that indicates that the platform is overloaded in response to sending a second request taken from the back off queue to the platform;
placing the second request to a head of the back off queue; and
resetting the back off time.

7. The user device of claim 1, wherein the first request is a request generated automatically by the user device, or is a request generated in response to an action by a user of the user device.

8. The user device of claim 1, wherein sending the requests in the back off queue comprises sending high-priority requests before sending low-priority requests.

9. One or more non-transitory computer storage media storing instructions that are operable, when executed by a user device comprising one or more computers, to cause the user device to perform operations comprising:
sending, to a platform comprising a plurality of host servers, a first request originating from client software running on the user device, wherein the first request is directed to a first endpoint of the platform, wherein the first endpoint is a composition of a first domain and a first path;
receiving, in response to the first request and from the platform, a first error that indicates that the platform is overloaded and that the first request was not processed;
determining, by the user device, a back off time;
receiving, from the client software, one or more subsequent requests to the platform originating from the client software that are initiated before the back off time elapses and that are directed to endpoints that are compositions of paths and the first domain and not to endpoints that are compositions of paths and a second domain that is not the first domain;
placing, by the user device, the first request and then the one or more subsequent requests in a back off queue in an order in which the subsequent requests are initiated; and
sending, by the user device and to the platform, the requests in the back off queue after the back off time has elapsed, until the back off queue is empty.

10. The one or more non-transitory computer storage media of claim 9, wherein sending the requests in the back off queue comprises sending the requests in the order in which the requests were placed into the back off queue.

11. The one or more non-transitory computer storage media of claim 9, wherein determining the back off time comprises setting the back off time from a retry-after value included in the first error that specifies an amount of time the user device should wait before resending the first request.

12. The one or more non-transitory computer storage media of claim 9, wherein determining the back off time comprises using a default value specified by the client software as the back off time.

13. The one or more non-transitory computer storage media of claim 9, wherein the operations further comprise:
adding new requests originating from the client software that are directed to the first endpoint to the back off queue while the user device is sending the requests in the back off queue to the platform; and
after the back off queue is empty, concurrently sending, to the platform, new requests originating from the client software that are directed to the first endpoint.

14. The one or more non-transitory computer storage media of claim 9, wherein the operations further comprise:
receiving a second error that indicates that the platform is overloaded in response to sending a second request taken from the back off queue to the platform;
placing the second request to a head of the back off queue; and
resetting the back off time.

15. The one or more non-transitory computer storage media of claim 9, wherein the first request is a request generated automatically by the user device, or is a request generated in response to an action by a user of the user device.

16. The one or more non-transitory computer storage media of claim 9, wherein sending the requests in the back off queue comprises sending high-priority requests before sending low-priority requests.

17. A server system comprising one or more computers configured to transmit to a user device one or more modules of instructions that are operable, when executed by the user device, to cause the user device to perform operations comprising:
- sending, to a platform comprising a plurality of host servers, a first request originating from client software running on the user device, wherein the first request is directed to a first endpoint of the platform, wherein the first endpoint is a composition of a first domain and a first path;
- receiving, in response to the first request and from the platform, a first error that indicates that the platform is overloaded and that the first request was not processed;
- determining, by the user device, a back off time;
- receiving, from the client software, one or more subsequent requests to the platform originating from the client software that are initiated before the back off time elapses and that are directed endpoints that are compositions of paths and the first domain and not to endpoints that are compositions of paths and a second domain that is not the first domain;
- placing, by the user device, the first request and then the one or more subsequent requests in a back off queue in an order in which the subsequent requests are initiated; and
- sending, by the user device and to the platform, the requests in the back off queue after the back off time has elapsed, until the back off queue is empty.

18. The server system of claim 15, wherein sending the requests in the back off queue comprises sending the requests in the order in which the requests were placed into the back off queue.

19. The server system of claim 15, wherein the operations further comprise:
- adding new requests originating from the client software that are directed to the first endpoint to the back off queue while the user device is sending the requests in the back off queue to the platform; and
- after the back off queue is empty, concurrently sending, to the platform, new requests originating from the client software that are directed to the first endpoint.

20. The server system of claim 15, wherein sending the requests in the back off queue comprises sending high-priority requests before sending low-priority requests.

21. The server system of claim 15, wherein determining the back off time comprises setting the back off time from a retry-after value included in the first error that specifies an amount of time the user device should wait before resending the first request.

22. The server system of claim 15, wherein determining the back off time comprises using a default value specified by the client software as the back off time.

23. The server system of claim 15, wherein the operations further comprise:
- receiving a second error that indicates that the platform is overloaded in response to sending a second request taken from the back off queue to the platform;
- placing the second request to a head of the back off queue; and
- resetting the back off time.

24. The server system of claim 15, wherein the first request is a request generated automatically by the user device, or is a request in response to an action by a user of the user device.

\* \* \* \* \*

UNITED STATES PATENT AND TRADEMARK OFFICE
CERTIFICATE OF CORRECTION

PATENT NO. : 10,911,568 B2  
APPLICATION NO. : 16/151266  
DATED : February 2, 2021  
INVENTOR(S) : Nolan O'Brien Page 1 of 1

It is certified that error appears in the above-identified patent and that said Letters Patent is hereby corrected as shown below:

In the Claims

Column 13, Line 22, Claim 17, after "directed" insert -- to --.

Column 13, Line 32, Claim 18, delete "claim 15," and insert -- claim 17, --, therefor.

Column 14, Line 1, Claim 19, delete "claim 15," and insert -- claim 17, --, therefor.

Column 14, Line 11, Claim 20, delete "claim 15," and insert -- claim 17, --, therefor.

Column 14, Line 14, Claim 21, delete "claim 15," and insert -- claim 17, --, therefor.

Column 14, Line 18, Claim 22, delete "claim 15," and insert -- claim 17, --, therefor.

Column 14, Line 22, Claim 23, delete "claim 15," and insert -- claim 17, --, therefor.

Column 14, Line 31, Claim 24, delete "claim 15," and insert -- claim 17, --, therefor.

Signed and Sealed this  
Twentieth Day of April, 2021

Drew Hirshfeld  
*Performing the Functions and Duties of the*  
*Under Secretary of Commerce for Intellectual Property and*  
*Director of the United States Patent and Trademark Office*